Oct. 10, 1939.　　　　E. M. MILLER　　　　2,175,720
CONTROL MECHANISM
Filed May 4, 1936　　　　5 Sheets-Sheet 1

Inventor
Ernest M. Miller
By George H. Fisher
Attorney Oct. 10, 1939.  E. M. MILLER  2,175,720
CONTROL MECHANISM
Filed May 4, 1936  5 Sheets-Sheet 2

Inventor
Ernest M. Miller
By George H Fisher
Attorney

Oct. 10, 1939.  E. M. MILLER  2,175,720
CONTROL MECHANISM
Filed May 4, 1936   5 Sheets-Sheet 3

Inventor
Ernest M. Miller
By George H. Fisher
Attorney

Oct. 10, 1939.  E. M. MILLER  2,175,720
CONTROL MECHANISM
Filed May 4, 1936  5 Sheets-Sheet 4

Inventor
Ernest M. Miller
By George H Fisher
Attorney

Fig. 15

Patented Oct. 10, 1939

2,175,720

UNITED STATES PATENT OFFICE 2,175,720

CONTROL MECHANISM

Ernest M. Miller, Minneapolis, Minn., assignor to Minneapolis-Honeywell Regulator Company, Minneapolis, Minn., a corporation of Delaware Application May 4, 1936, Serial No. 77,758

21 Claims. (Cl. 200—138)

This invention relates to control mechanism and more particularly to that type of control wherein a switching mechanism actuated by a condition responsive element serves to open or close a circuit or a plurality of circuits.

While this invention has particular utility in the control of an oil burner having an ignition mechanism in association therewith and will be hereinafter described in such connection, it is also adapted to be used with other heat producing devices in the general art of heat control.

One object of this invention is the provision of an improved connection between a condition responsive element or member actuated thereby and circuit controlling mechanism whereby, upon motion of the condition responsive element within predetermined limits, the circuit controlling mechanism will be actuated, but upon motion in excess of such limits, the element may continue to move without imparting further movement to the circuit controlling mechanism.

A further object resides in the provision of a mechanism adapted to function as set forth in the preceding paragraph in conjunction with a longitudinally movable bar or rod actuated by a thermostatic element.

A further object is the provision of improved means actuated by a thermostatic element through a linearly movable member and the connection as above set forth to actuate a plurality of contacts, one or more of which moves to open position and the others of which move to closed position on condition change in one direction, the motion being reversed upon condition change in the opposite direction, so arranged that the closing of certain of the contacts occurs before opening of others upon condition change in one direction and the others close subsequent to the opening of the first mentioned contacts upon motion in the opposite direction.

A further object is the provision of an improved safety switch comprising a novel arrangement of elements in association with the contacts above mentioned to preclude actuation of a fuel burning mechanism, such as an oil burner, through closure of these contacts after a predetermined time, upon combustion failure.

A more specific object is the provision of such a safety switch so arranged that upon resetting by a manual reset lever all stress is exerted directly on the lever and motion transmitted to the movable parts directly therefrom rather than through other associated elements or connections.

An additional object is the provision of a thermostatic element adapted to provide linear motion to an element in association with the mechanism accomplishing the objects as set forth above which may be encompassed in a relatively small space and inserted into said space through a relatively small aperture.

A further object is the mounting of the structures above referred to, and to be described hereinafter, in a single relatively compact housing in such a manner that the overall dimensions of such a housing are materially reduced as compared to those of analogous structures in the prior art and in such a fashion that all the parts are readily accessible for adjustment or replacement.

Other objects will in part be obvious and in part pointed out hereinafter.

The invention, accordingly, consists in the features of construction, combinations of elements and arrangements of parts as will be hereinafter described and shown in the accompanying drawings and the scope of the application of which will be indicated by the appended claims.

In the accompanying drawings wherein is shown, illustratively, one of the various possible embodiments of this invention.

Similar reference characters refer to similar parts throughout the several views of the drawings.

Figure 1:
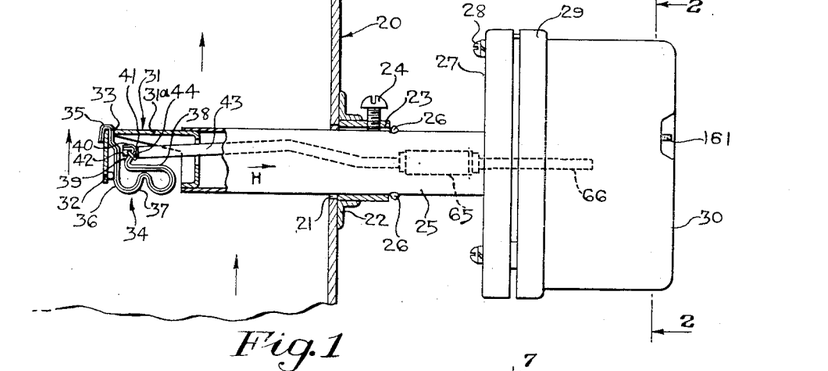
Figure 1 is a side elevation of a stack or flue adjacent a furnace or other source of heat having mounted thereon a structure embodying the instant invention, certain parts thereof being shown in section.

Referring now particularly to Figure 1, there is generally indicated at 20 a fragment of a stack or flue or other device associated with a furnace or other source of heat having an aperture 21 passed therethrough and a mounting bracket comprised of a flange 22, an annulus 23 and a set screw 24 rigidly secured thereto in any desired manner. Passed through annulus 23 is a sleeve 25 having projections 26 thereon to limit the depth of insertion of sleeve 25 into stack 20. Rigidly secured to one end of sleeve 25 is a mounting plate 27 to which is secured, as by screws 28, a supporting flange 29 to which in turn is detachably secured a casing 30 containing certain mechanism to be hereinafter described. The opposite end of sleeve 25 has rigidly associated therewith a mounting bracket 31 which comprises a laterally extending portion 31a and downwardly depending portion 32. An aperture 33 is located substantially at the junction of portions 31a and 32. A bimetal element, generally indicated at 34, comprises a hooked portion 35 which is adapted to be inserted in aperture 33, a downwardly depending portion 36, a convoluted portion 37, a reentrant linear portion 38 and an upwardly extending portion 39 bent into a hook 40. An aperture 41 in hook 40 accommodates the reduced end 42 of a rod 43 which extends inwardly through sleeve 25. A pin 44 passed through a suitable aperture in end 42 holds the parts in related assembly.

From this it will be seen that as the temperature in stack 20 changes, bimetal element 34 expands or contracts, and due to the configuration above described, such expansion or contraction is transmitted to rod 43 in the form of linear movement back and forward in sleeve 25. Convoluted portion 37 provides a substantially large area of bimetal to transmit a correspondingly large amount of motion to rod 43, but due to the configuration above described, the element may be readily passed through aperture 21 or, in other words, into a space through any aperture through which sleeve 25 may pass. In the illustrative embodiment, the arrangement of the bimetal is such that upon temperature rise in stack 20, bimetal element 34 expands to force rod 43 outwardly with respect to stack 20 through sleeve 25 in the direction indicated by the arrow H, and, conversely, as the temperature decreases, element 34 contracts to draw rod 43 further into the stack 20. It will readily be understood, however, that by reversing the position of the component metals of element 34 with respect to the curvature thereof, an opposite effect may be achieved, if desired.

Figures 3, 14:
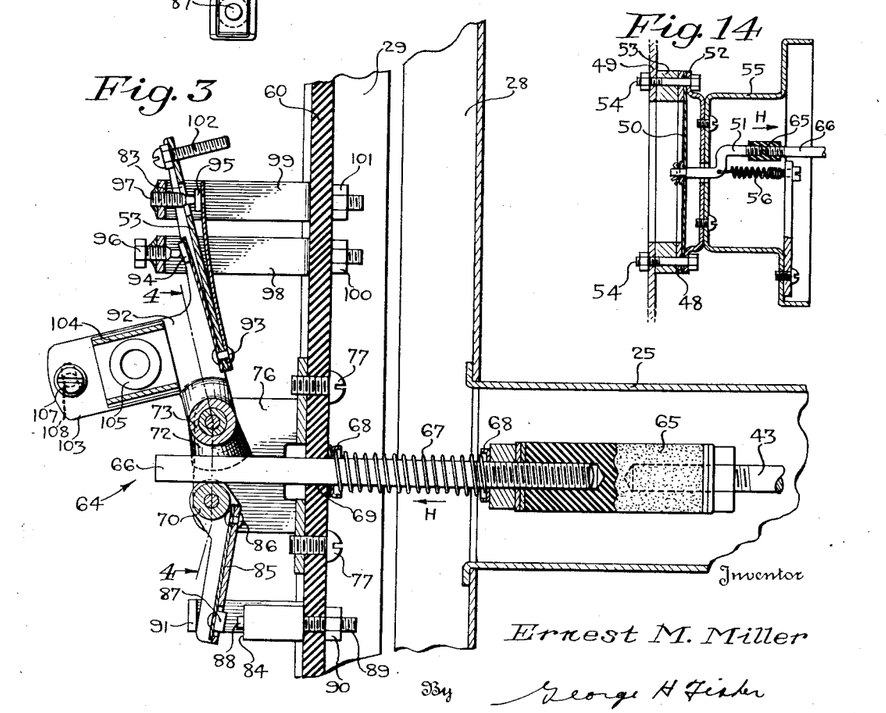
Figure 3 is an enlarged side elevation taken along line 3—3 of Figure 2 from the right, certain parts thereof being omitted.
Figure 14 shows a modified form of certain features of the invention.

In Figure 14, there is shown a modification of the structure above described adapted to be mounted on a plane surface, such as a furnace door 49. In this form, the thermostatic element comprises a disk 50 through which is passed the reduced end of a rod 51. Disk 50 is suitably mounted in a flange 52 and has superposed about its periphery a ring 48 and a heat resisting gasket 53, the parts being held in related assembly as by means of screws 54. This structure is substantially of the type disclosed in Patent No. 1,765,056 to Lewis L. Cunningham entitled "Automatic device" in which patent this operation is fully set forth. Flange 52 is secured to a casing 55 which is in its essentials analogous to sleeve 25, above described. A spring 56 engaging a bend in rod 51 serves normally to hold disk 50 flexed inwardly in order that upon temperature rise, the expansion of disk 50 will be transmitted into inward linear movement of rod 51 in the direction indicated by the arrow H. Conversely, contraction of disk 50, due to a drop in temperature, will serve to draw rod 51 outwardly to operate suitable mechanism of the same sort as will be hereinafter described for use in connection with thermostatic element 34 and rod 43.

Figure 2:
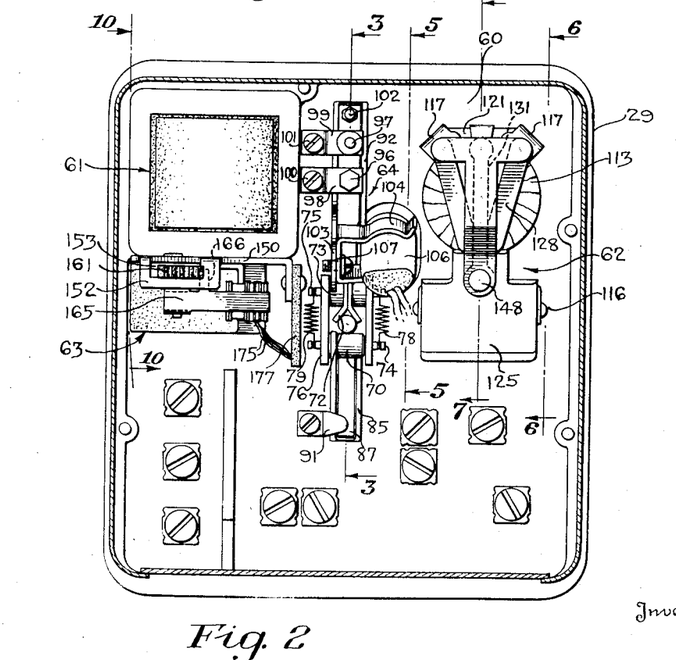
Figure 2 is an enlarged front elevational view taken along line 2—2 of Figure 1 as viewed from the right.

Referring now to Figure 2, an insulating panel 60 is contained within supporting flange 29 and secured thereto in any suitable manner. Panel 60 carries a conventional transformer, generally indicated at 61, a relay mechanism, generally indicated at 62, a safety switch, generally indicated at 63, and contact making and breaking means, generally indicated at 64, the latter three of which mechanisms will be more fully described hereinafter. A plurality of terminals to permit connection of the device to associated mechanism to be hereinafter described are also provided in panel 60.

Figure 4:
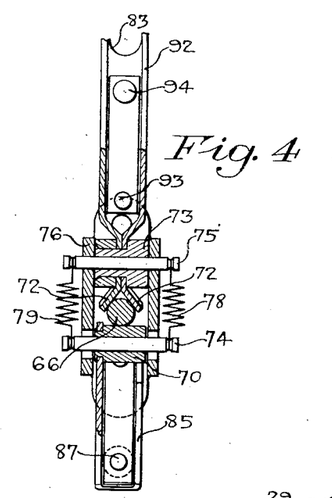
Figure 4 is a sectional view taken along line 4—4 of Figure 3 viewed from the left, certain parts being omitted.
Figure 5:
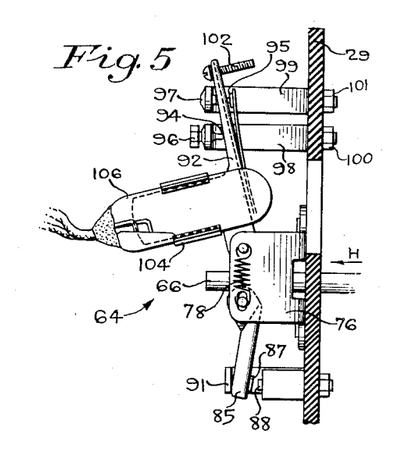
Figure 5 is a side sectional view taken along line 5—5 of Figure 2 as viewed from the right.

Referring now to Figure 3, the end of rod 43 opposite bimetal element 34 is screw threaded into an insulating block 65, into the other end of which is also screw threaded an end of a second rod 66. A spring 67 positioned between two cup washers 68, one of which abuts block 65 and the other of which abuts panel 60, serves to hold rod 43 rigidly against hook 40 of bimetal element 34 in order that slight temperature variations may be transmitted directly and substantially immediately to rod 66. Referring back to Figure 14, rod 51 operated by disk 50 is likewise screw threaded into an insulating block 65 which in turn operates a rod 66, as in Figure 3. However, spring 67 of Figure 3 is not required in the structure shown in Figure 14 since spring 56 serves an analogous purpose. The end of rod 66 opposite block 65 extends through a suitable aperture 69 in panel 60 and passes between a roller 70, as better shown in Figure 4, and two arcuate surfaced depending portions 72 carried by a second roller 73. Axles 74 and 75 pass through rollers 70 and 73, respectively, and are journaled, as better shown in Figure 5, in a suitable U shaped bracket 76 secured to panel 60 in any suitable manner, as by screws 77 (see Figure 3). Springs 78 and 79 engage adjacent ends of axles 74 and 75 and serve to draw rollers 73 and 70 towards each other and, consequently, insure a relatively tight frictional engagement of portions 72 and roller 70 with rod 66.

Mounted on roller 70 for rotation therewith is an extending arm 85 which has secured thereto, as by a rivet 86, a leaf spring contact 87 adapted to abut a stationary contact 88 which is provided with a shoulder 84 to limit motion of lever 85 in a direction towards panel 60 and secured thereto as by a binding post 89 and nut 90. A stop member 91 suitably secured to panel 60 serves to limit motion of arm 85 in a direction away from contact 88.

Depending portions 72 comprise the lower extremities of a second arm 92 which has secured thereto, as by a rivet 93, a pair of leaf spring contacts 94 and 95, one on either side adapted to engage respectively contact screws 96 and 97 carried in turn by supporting members 98 and 99 which are secured as by screws and nuts 100 and 101 to panel 60. An aperture 83 is provided in arm 92 to permit passage of contact screw 97 therethrough to engage contact 95. An adjustable screw 102 is passed through a suitable threaded aperture in the upper extremity of arm 92 and serves to limit the motion of arm 92 in a direction towards panel 60, outward movement thereof being limited by member 99.

An extending portion 103 of arm 92 carries a mercury switch clip 104, secured thereto as by a rivet 105. Clip 104, in turn, carries a mercury switch 106 (see Figure 5) and the arrangement is such that switch 106 is tilted to open and closed positions by the movement, as will be hereinafter described, of arm 92. A screw 107 adapted to engage a suitable threaded aperture in clip 104 passes through a slot 108 in arm 103 and by adjustment of screw 107 with respect to slot 108 the angle of inclination of switch 106 may be adjusted.

From the foregoing it will now be seen that motion of thermostatic element 34 is transmitted through rod 43 and block 65 to rod 66 and that as rod 66 is moved towards the left, as viewed in Figure 3, in the direction indicated by the arrow H occasioned by temperature rise, as above stated, contacts 94 and 95 will move to the right and break contact with their respective contacts 96 and 97. Simultaneously, arm 85 will move to the right and contact 87 will engage contact 88. Upon such motion, mercury switch 106 will be tilted through extension 103 of arm 92 to open position. The above movements are occasioned by the frictional engagement of rod 66 with depending portions 72 and roller 70, respectively, as above stated, these elements being held in frictional engagement with rod 66 by springs 78 and 79. Continued movement of rod 66 to the left will cause the abutment of stop screw 102 with panel 60 and, likewise, the engagement of arm 85 with shoulder 84 of contact 88, which abutments will preclude further motion of arms 92 and 85. Continued motion of rod 66 to the left occasioned by a further rise in temperature will merely cause rod 66 to slip between rollers 70 and depending portions 72 without injury to the mechanism since springs 78 and 79 are of insufficient strength to hold the members in such rigid assembly as to occasion any strain on the component parts.

Upon a drop in temperature, rod 66 moves to the right, as viewed in Figure 3, and by the same frictional engagement above described, immediately moves arm 92 and its associated contacts 94 and 95 to the left into engagement with their respective opposed contacts 96 and 97 and also causes a corresponding immediate movement of arm 85 to break contacts 87 and 88. Stop 91 limits motion of arm 85 and correspondingly the inturned portion of member 99 which accommodates contact 97 precludes undue outward movement of arm 92. Further motion of rod 66 to the right simply causes slippage of the parts as described above.

It may here be pointed out that rod 66 is preferably of a length sufficient to preclude all possibility of its passing entirely from between portions 72 and roller 70, since the motion to the right upon cooling is limited by the abutment of hook 40 with portion 36 of thermostatic element 34.

The arrangement of the above apparatus is such that the various contacts close and/or open in predetermined timed relationship, and in the preferred embodiment of the invention upon movement of rod 66 to the left, contact 94 first moves away from its opposed contact 96, contact 87 then engages contact 88, contact 95 moves away from contact 97 and mercury switch 106 then assumes its open circuit position. Upon movement of rod 66 to the right, contact 87 first breaks from contact 88, mercury switch 106 moves to closed circuit position, contacts 94 and 96 make and contacts 95 and 97 then make.

It will thus be seen that there is an overlapping contact upon movement of rod 66 to the left in order to maintain a circuit or circuits closed at all times, but that there is non-overlapping contact upon movement of rod 66 to the right and that consequently immediately upon such movement which, as above stated, is occasioned by a fall in temperature adjacent thermostatic element 34, a circuit or circuits through the various contacts above mentioned will be immediately broken. The reason for the sequence of operation above set forth and the advantages achieved thereby will be pointed out hereinafter. It will be readily understood that numerous factors of the positioning and arrangement of elements enter into the determination of the proper relationship of the parts with respect to each other in order to produce the above described sequence. Such factors may include the predetermination of the diameter of rollers 70 and the radius of curvature of depending portion 72 since it will be understood that where, as here, one of the rollers is of less diameter than the other, a more rapid travel will be imparted to its associated contact arm. The length and positioning of contact screws 96 and 97 may also have a bearing upon the sequence of operation, as likewise, may the angle of inclination of mercury switch 106 with respect to extending portion 103 of arm 92.

The above sequence may be changed to suit the requirements of any system with which the mechanism is associated by the mechanical arragement and positioning of the parts and elements above mentioned. Likewise, the duration of the intervals between the opening and/or closing of the various contacts may be varied in the same manner.

Referring now to Figures 6 to 9, inclusive, wherein are shown various portions of relay 62, a laminated core 110 is secured to panel 60, as by the engagement of nuts 111 with suitable threaded extensions 112 on the legs of core 110. A coil 113 is wound about one of the legs of core 110 and a suitable spacer ring 114 is positioned adjacent coil 113. An armature 115 is pivotally mounted as by a pivot pin 116 which passes through suitable apertures in a bracket 115a secured to armature 115 and a bracket 109 secured to core 110. A pair of contact carrying members 117 are secured, as by nuts 118, to panel 60 and carry at their outer ends contacts 119. An additional contact 120 is carried by a suitably insulated bar 121 (see Figure 8) positioned between contact carrying members 117.

Figure 6:
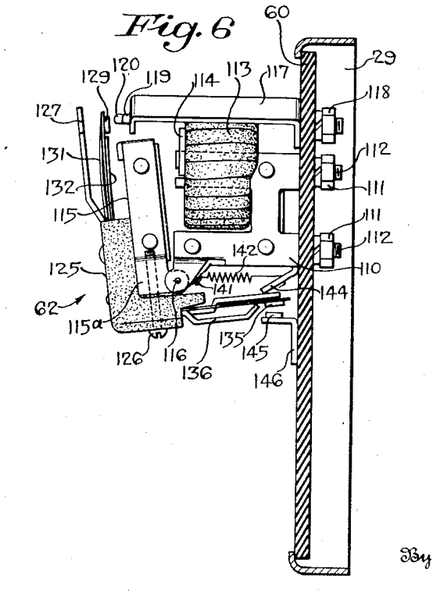
Figure 6 is a side elevational view of the mechanism shown in Figure 2 as seen from the right along line 6—6, certain parts being omitted.
Figures 7, 8, 9:
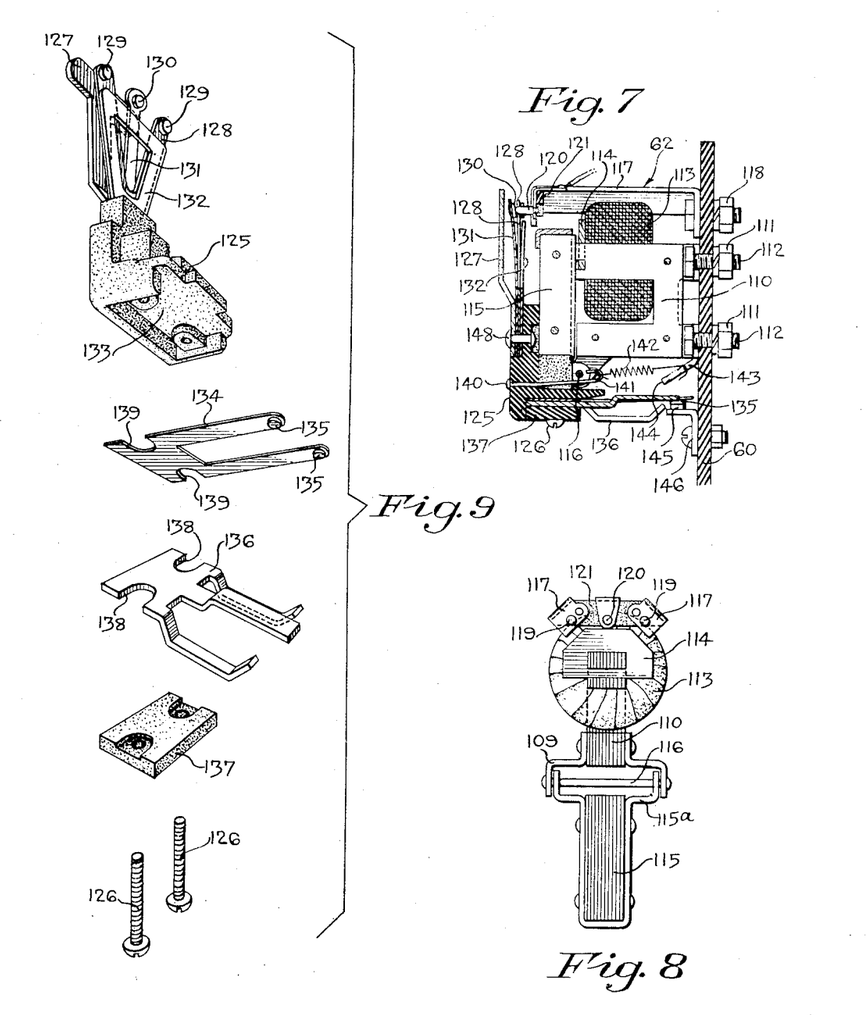
Figure 7 is a sectional view along line 7—7 of Figure 2.
Figure 8 is a front view of certain of the parts shown in Figures 6 and 7, certain portions thereof being moved out of operative position to show other parts more clearly and other parts thereof being removed.
Figure 9 is an exploded perspective view of certain parts shown in elevation in Figure 6 and omitted in Figure 8.
Figure 10:
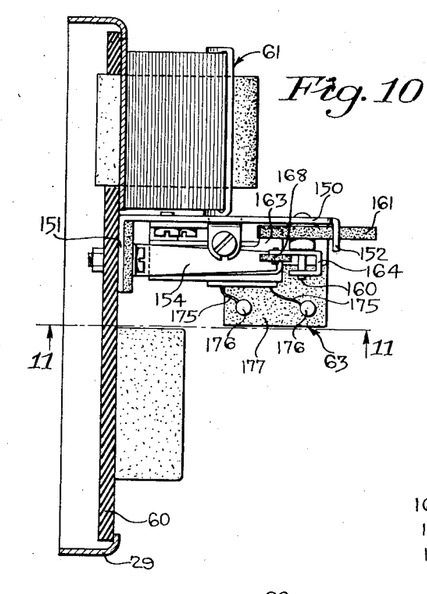
Figure 10 is a side elevational view of the structure shown in Figure 2 as seen from the left along line 10—10, certain parts being omitted.

As better shown in Figures 6 and 7, an insulating block 125 is secured to armature 115, as by means of screws 126, which engage suitable threaded apertures in bracket 115a. Insulating block 125 has secured thereto, as by a rivet 130, a guard member 127 and, as better shown in Figure 9, a V shaped leaf spring contact carrying member 128, carrying at the extremities of the V a pair of contacts 129. A third contact 130 is carried by a spring leaf 131, which extends between the two legs of V shaped member 128 and a suitable guard 132 is positioned interiorly of the guard 127 and members 128 and 131. As better shown in Figure 7, rivet 130 passes through suitable apertures in members 127, 128, 131 and 132 and also a portion of insulating block 125 to hold the mechanism in related assembly. Contacts 129 are positioned to engage contacts 119 and contact 130 to engage contact 120 when the relay is energized in a manner to be described hereinafter.

An aperture 133 in the base of insulating block 125 accommodates an end of a U shaped spring leaf contact carrying member 134 having contacts 135 at its extremities and a guard member 136 adapted to limit the spring movement of contact carrying member 134 and also to limit the movement of armature 115 away from core 110 by abutment with a projection 140. An insulating block 137 of a size and configuration to be accommodated in recess 138 completes the assembly. Screws 126 pass through block 137 and suitable indentations 138 and 139 in guard member 136 and contact carrying member 134, respectively, and thence pass through insulating block 125 into engagement with the above mentioned apertures in bracket 115a pivoted on relay core 110.

As better shown in Figure 7, a pin 140 is passed through block 125 and terminates in a hook shaped portion 141 adjacent, and in alignment with, pin 116. One end of a spring 142 engages hook 141 and the other end engages a suitable aperture 143 in depending lug 144 secured to core 110. The purpose of spring 142 is to preclude excessive movement of armature 115 with respect to pin 116, in other words, to preclude relay vibration. The arrangement is such that spring 142 pulls inwardly in a line directly in alignment with pin 116 whereby it exerts no undue stress to either open or close armature 115.

As will be seen from Figure 7, contacts 135 are adapted to engage opposed contacts 145 secured to mounting members 146 which are in turn secured to panel 30. Suitable connections, to be hereinafter discussed, lead from contacts 145 and, likewise, from contacts 119 and 120.

From the above it will be seen that when relay 62 is closed by the closure of a circuit, to be hereinafter described, contacts 129 engage contacts 119, contact 130 engages contact 120 and contacts 135 engage contacts 145. The purpose and objects of this contact closure will be more fully described hereinafter in connection with the wiring diagram shown in Figure 15.

In Figures 10 to 13, inclusive, there is shown in detail a safety switch mechanism, generally indicated at 63. This mechanism comprises a mounting bracket 150, which has at one extremity a downwardly depending portion 151 and at the other extremity a second downwardly depending portion 152. As better shown in Figure 12, portion 152 has an aperture 153 therethrough. A pair of spring leaf contact members 154 and 155 are carried by bracket 150 and secured thereto by screws 156, which pass through an insulating panel 157 and relatively large apertures in flange 151 into panel 30 and thus serve not only to support contact members 154 and 155 but also to maintain bracket 150 in related assembly with panel 30 through the frictional engagement of panel 157 and panel 30 with opposite sides of flange 151. The enlarged apertures which may if desired be filled with suitable insulating washers are to preclude any electrical contact between flange 151 and screws 156 which it will be seen are in electrical engagement with members 154 and 155. Members 154 and 155 bear on their adjacent surfaces opposed contacts 158 and 159, the separation of which serves to break a circuit for a purpose to be hereinafter described. Adjacent the extremities of contact members 154 and 155 and supported by bracket 150 is a pivot pin 160, which has mounted thereon a manually operable lever 161, comprised of insulating material to preclude interference with a circuit through arms 154 and 155. Lever 161 has an arcuate portion 162 at an extremity thereof, adapted, under certain circumstances, to abut an upwardly extending portion 163 of contact member 155. Also carried by pin 160 is a bracket member 164, which has a lateral extension 165 and a vertically extending portion 166 (see Figure 12). Extension 166 is adapted to be engaged, under certain circumstances, by a projection 167 of member 161. Bracket member 164 also has rigidly associated therewith a circular portion 168 also comprised of insulating material. A mounting member 169 is connected to bracket 150, as by a screw 170 and a screw 100 in a slot 101 which latter permits adjustment of the assembly with respect to extension 165. Two bimetallic strips 171 and 172, secured together as by a stud 173, are suitably secured to mounting member 169. Mounted adjacent member 172 is a resistance element comprised of a coil 174 having wires 175 leading thereto from suitable terminals 176 carried by a depending insulating panel 177, secured in any desired manner to bracket 150. Rigidly secured to the free end of bimetal strip 172 and on the opposite side of coil 174 is a third bimetal element 178, which has, as better shown in Figure 13, an upwardly extending portion 179 adapted, under certain circumstances to be set forth hereinafter, to engage extension 165.

The disposition of the component metals of strips 171 and 172 is opposite in order that a change in temperature value applied equally to both will cause a balancing movement of the two strips in opposite directions. In other words, the positioning of strips 171 and 172 is designed to overcome the effect of ambient temperature changes on the assembly. Resistance 174 is positioned, as above stated, adjacent strip 172 and heat therefrom accordingly affects strip 172 more strongly than strip 171 to overcome the compensating effect under conditions to be hereinafter described. Element 178 is so arranged that temperature change will occasion movement thereof corresponding to the movement of strip 172 and since heat from resistance 174 is supplied to both strips 172 and 178, such temperature rise will by the multiplication of energy occasioned by the two elements readily overcome any resistance offered by element 171.

Figure 11:
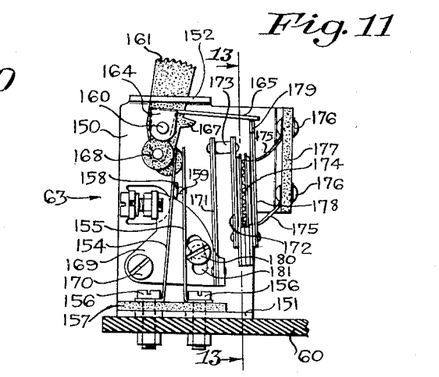
Figure 11 is a view taken along line 11—11 of Figure 10 as viewed from the bottom.
Figure 12:
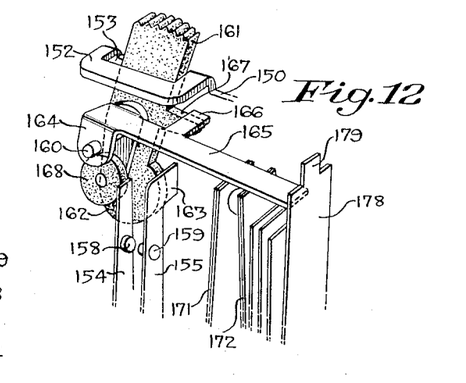
Figure 12 is a perspective view of certain portions of the structure shown in Figure 11 in a different position of adjustment.
Figure 13:
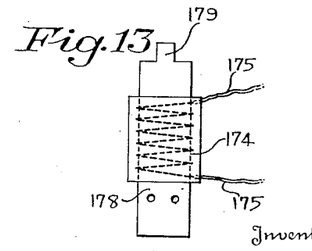
Figure 13 is a schematic side elevation of one of the elements shown in Figure 11 as taken along line 13—13 of Figure 11.

In operation, when a circuit passes through coil 174, as will be later described, the bimetal assembly comprised of elements 171, 172 and 178 tends to expand and the arrangement, as above stated, is such that such expansion causes the assembly to move in a direction away from contact carrying members 154 and 155. Upon such motion, portion 179 will move beyond the end of extension 165, which due to the spring pressure exerted on portion 168 by spring contact carrying member 154, will immediately drop into the position shown in Figure 12, which permits contacts 158 and 159 to separate and due to the pressures of arcuate portion 162 against extending portion 163 of spring contact arm 155, contact 159 will be precluded from moving with contact 158 as the latter moves away. Extension 165 also serves to hold the bimetal assembly in the position shown in Figure 12 until such time as lever 161 is moved manually to the left, as seen in Figure 11. Upon such motion, projection 167 engages extension 166 and lifts extension 165 out of engagement with projecting portion 179. Since the breaking of contacts 158 and 159 serves to break the circuit through coil 174, all as will be more fully set forth hereinafter, the bimetal assembly will cool substantially immediately after the cessation of heat in coil 174 and upon the raising of extension 165 by movement of manual reset lever 161 returns to its normal or closed position. Contacts 158 and 159 close and the device will be ready to repeat the previously described cycle of operation.

It may here be pointed out that due to the configuration of lever 161, contacts 158 and 159 will not close until lever 161 has been manually moved to the left and released whereupon pressure of spring arm 154 and extension 163 against circular member 168 and curved member 162, respectively, will return the switch to its normal right hand closed circuit position. It will be noted that there is a clearance between projection 167 and extension 166 and that due to this clearance upon movement of lever 161 to the left, curved portion 162 will first engage extension 163 to move it to the right. After the clearance above mentioned has been closed, projection 167 will engage extension 166, which will in turn move circular member 168 a short distance to the right until such time as extension 165 clears projection 179. Then upon release of lever 161, the spring pressure, as above described, will permit the parts to return to normal position and the contacts 158 and 159 to close.

From the foregoing it will be seen that all stress on the movable parts of the device, such as projection 165 and contact bearing arms 154 and 155 is transmitted directly thereto from lever 161 and that no strain other than normal spring pressure is placed upon contact bearing arms 154 and 155. In other words, movement of lever 161 causes projection 167 to move extensions 166 and 165 and circular member 168 to move contact arm 154, and pressure of arcuate portion 162 against extension 163 causes movement of contact arm 155.

By this means the resiliency of arms 154 and 155 is less apt to be impaired, the life of the switch is lengthened, and more efficient operation assured.

Figure 15:
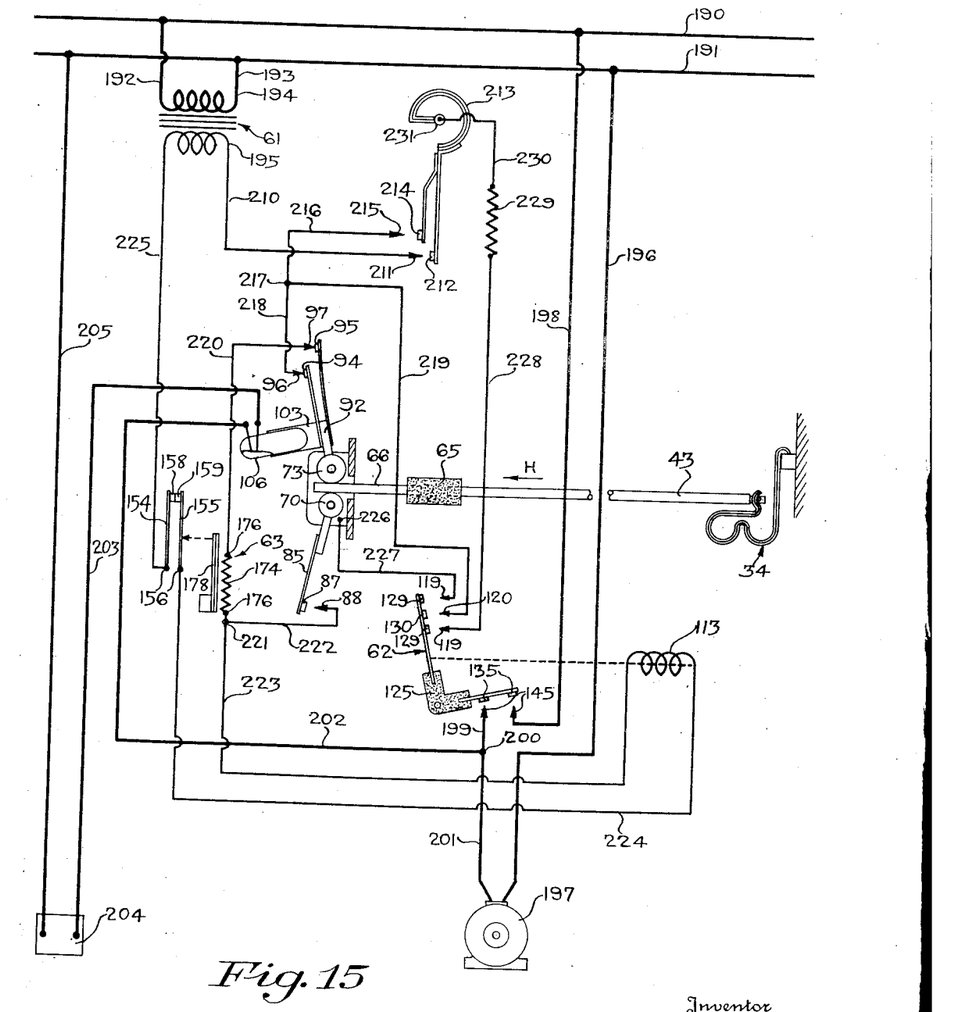
Figure 15 is a schematic view showing diagrammatically the wiring connections of the structure of the instant invention in association with one form of control system to which it may be applied.

Referring now to Figure 15 wherein is shown schematically one type of system with which the structure of the instant invention may be advantageously used, there are shown line wires 190 and 191 from which power enters the system from a suitable source (not shown). Wires 192 and 193 connect the primary 194 of transformer 61, which is of the step-down type, having a secondary 195 across line wires 190 and 191. A wire 196 leads from wire 191 to a suitable burner motor 197. A second wire 198 terminates in one of contacts 145 from the other of which a wire 199 extends to a junction 200 from which a wire 201 leads to motor 197. A wire 202 leads from junction 200 to mercury switch 106 from which a wire 203 leads to a suitable ignition device 204 which may take the form of a conventional step-up transformer. A wire 205 leads from ignition device 204 to line wire 191.

It will thus be seen that when contacts 145 engage and are bridged by opposed contacts 135, in a manner to be described hereinafter, motor 197 is energized, the circuit comprising line wire 191, wire 196, motor 197, wire 201, junction 200, wire 199, contacts 135 and 145, wire 198 to line wire 190.

It will also be seen that when the above mentioned contacts are closed and mercury switch 106 is closed, ignition device 204 is also energized, the circuit comprising line wire 190, wire 198, contacts 135 and 145, wire 199, junction 200, wire 202, mercury switch 106, wire 203, ignition device 204, wire 205 to line wire 191.

A wire 210 leads from one side of transformer secondary 195 to a contact 211, which is positioned opposite a contact 212 carried by one arm of a conventional bimetallic room thermostat 213. Thermostat 213 also carries a contact 214 adapted to engage an opposed contact 215 from which a wire 216 leads to a junction 217. A wire 218 leads from junction 217 to contact 96. A wire 219 also leads from junction 217 to contact 120. From opposed contact 97, a wire 220 leads to one terminal 176 of resistance element 174 and thence through the other of terminals 176 to a junction 221. From junction 221, a wire 222 leads to contact 88 and a second wire 223 to relay coil 113. From the opposite side of relay 113, a wire 224 leads to one of terminals 156 adjacent arm 155 carrying contact 159. The other of terminals 156 adjacent arm 154 carrying contact 158 has a wire 225 leading therefrom to the opposite side of transformer secondary 195. From a terminal 226 in electrical association with contacts 94, 95 and 87, a wire 227 leads to one of contacts 119. From the other of contacts 119, a wire 228 leads to a resistance 229 from which a wire 230 leads to a terminal 231 carried by thermostat 213.

In Figure 15, room thermostat 213 is shown in its hot, or inoperative, position. Assume now that there is a call for heat in the space surrounding thermostat 213, upon a given predetermined drop in temperature, contact 212 engages contact 211 and shortly thereafter, after a subsequent predetermined drop, contacts 214 and 215 engage. An energizing circuit is now established from transformer 195 through wire 210, contacts 211 and 212, 214 and 215, wire 216, junction 217, wire 218, contacts 96 and 94 through member 92, contacts 95 and 97, wire 220, resistance 174, junction 221, wire 223, relay coil 113, wire 224, arm 155, contacts 159 and 158, arm 154 and wire 225 back to transformer secondary 195. Relay coil 113 being energized, contacts 135 engage their opposed contacts 145 to energize the motor circuit above described. Likewise, mercury switch 106 being closed, ignition device 204 will be energized through the above described circuit. Simultaneously, upon closing of contacts 145 and 135, contact 130 will engage contact 120 and contacts 129 will engage their opposed contacts 119. This engagement will close additional circuits, to be described hereinafter, which will be inoperative because of the fact that the circuit above described, through thermostat carried contacts 212 and 214 and contacts 95 and 94, offers the least resistance to the flow of current.

Assuming the parts to be in normal operating order, ignition device 204 ignites a fire fed by a burner motor 197 which occasions a relatively rapid rise in temperature in the stack or flue in which is positioned thermostatic element 34. This rise in temperature causes an expansion of element 34 and a consequent movement of rod 66 to the left in the direction indicated by the arrow H. Such movement first opens contacts 96 and 94. Upon such opening, a circuit previously closed by the energization of relay coil 113 comprised of transformer secondary 195, wire 210, contacts 211 and 212, 214 and 215, wire 216, junction 217, wire 219, contacts 120 and 130, 129 and 119, wire 227, terminal 226, member 92, contacts 95 and 97, wire 220, resistance 174, junction 221, wire 223, relay coil 113, wire 224, contacts 159 and 158 and wire 225 back to transformer secondary 195 will continue to maintain relay coil 113 energized and permit burner motor 197 and ignition device 204 to operate.

It should here be noted that both the energizing circuits above described pass through resistance 174 of safety switch 63. If after a predetermined time, as illustratively 30 seconds, ignition device 204 fails to produce combustion in the burner to occasion a consequent temperature rise in the stack, or other space containing thermostatic element 34, bimetal element 178 is heated, due to its juxtaposed position to resistance 174, and breaks contacts 158 and 159, which, as will be seen from the consideration of the circuits traced above, immediately breaks the circuit, and permits relay coil 113 to be deenergized and, consequently, opens contacts 135 and 145 to render the system inoperative until manually reset by means of manual reset lever 161 (see Figure 11).

It should here be pointed out that should contacts 214 and 215 break at this point, a third circuit will also pass through resistance 174. This circuit is comprised of transformer secondary 195, wire 210, contacts 211 and 212, thermostat 213, terminal 231, wire 230, resistance 229, wire 228, contacts 119 and 129, wire 227, junction 226, contacts 95 and 97, wire 220, resistance 174, junction 221, wire 223, relay coil 113, wire 224, member 155, contacts 159 and 158, member 154, and wire 225 back to transformer 195. While the above described circuit will be established only on infrequent occasions since in normal operation contacts 214 and 215 will not break until a temperature rise has been occasioned by energization of burner 197, its occurrence is possible and in such contingency upon continued failure of ignition device 204 to create combustion, contacts 158 and 159 are broken as above described.

Under normal circumstances, however, combustion is produced by ignition device 204 and the temperature in the space containing element 34 rises. A continued rise causes rod 66 to move further towards the right to cause contact 87 to engage contact 88. A holding circuit is now established comprised of transformer secondary 195, wire 210, contacts 211 and 212, 214 and 215, wire 216, junction 217, wire 219, contacts 120 and 130, contacts 129 and 119, wire 227, terminal 226, arm 85, contacts 87 and 88, wire 222, junction 221, wire 223, relay coil 113, wire 224, contacts 158 and 159, wire 225, back to transformer secondary 195. This circuit, of course, continues to energize relay coil 113 to maintain burner 197 and ignition device 204 in operation, but resistance 174, wire 220, contacts 95 and 97, arm 92, contacts 94 and 96 and wire 216 are now shunted out.

A continued increase in stack temperature adjacent element 34 causes the opening of contacts 95 and 97, which now has no effect on the circuits since these contacts are shunted out by the circuit described immediately above. After contact 95 breaks from contact 97, mercury switch 106 is tilted by the movement of extension 103 of arm 92 to open position to deenergize ignition device 204, and burner 197 continues to operate as long as there is a call for heat indicated by the position of thermostat 213. The operation of burner motor 197 in the course of time raises the temperature in the space containing thermostat 213 to a predetermined point at which contacts 214 and 215 break.

A new holding circuit is now established which comprises transformer secondary 195, wire 210, contacts 211 and 212, thermostat 213, terminal 231, wire 230, resistance 229, wire 228, contacts 119 and 129, wire 227, terminal 226, arm 85, contacts 87 and 88, wire 222, junction 221, wire 223, relay coil 113, wire 224, contacts 158 and 159, wire 225 back to transformer secondary 195.

It should be noted here that the circuit above described was previously made upon the closing of relay 62 and contacts 87 and 88 but due to resistance 229, was shunted out by the closure of contacts 214 and 215. However, the breaking of contacts 214 and 215 renders this above described circuit operative and passage of current through resistance 229 heats the same which since it is positioned adjacent thermostat 213 occasions an oscillation of the movement thereof by the addition of false heat thereto and consequent rapid breaking of contacts 211 and 212, thereby decreasing the differential of operation of the thermostat. Immediately, upon the breakage of the latter two contacts, the system is completely deenergized, burner motor 197 ceases to operate and the parts after an interval return to their cold position. Upon cooling of the temperature in the space in which is mounted element 34, rod 66 moves to the right and first breaks contacts 87 and 88, then moves mercury switch 106 to its closed position, then causes contact 94 to engage contact 96 and finally contact 95 to engage contact 97, whereupon the parts will be in their normal operating position and ready for a further call for heat by thermostat 213.

It should here be noted that in the event of flame failure at any time during the operation of the device, a drop in temperature adjacent element 34 causes a relatively immediate movement of rod 66 to the right to open contacts 87 and 88 and that such opening occurs prior to the making of contacts 94 and 96 or 95 and 97 and, accordingly, results in the deenergization of the system. The system then automatically recycles and after a predetermined period sufficient to permit cooling of the stack temperature, assuming that thermostat 213 still calls for heat, the energizing circuit first described is reestablished and upon a continued flame failure for a predetermined period of, as above mentioned, thirty seconds, the safety switch 63 operates to break contacts 158 and 159 and completely deenergize the system until manually reset as described above.

From the foregoing it will be seen that there is herein provided an improved mechanism which will occasion accurate operation of a system as above described in a satisfactory and efficient manner and which will provide all of the usual safety features in connection with an oil burner system.

It will also be seen that there is provided in the structure above described an instrument capable of realizing the objects of the invention including many advantages of great practical importance.

As many possible embodiments may be made in the above structure and as many modifications may be made in the above embodiment, it is to be understood that all matter hereinbefore set forth or shown in the accompanying drawings is to be interpreted as illustrative and not in a limiting sense.

I claim as my invention:

1. A device of the character described, comprising, in combination, a condition responsive means, a linearly movable element associated therewith, hence movable in response to condition change, a pair of oppositely disposed arcuate surfaced members tangentially disposed with respect to said element and in frictional engagement therewith, arms substantially rigidly associated with said members, and circuit controlling means disposed on said arms whereby linear movement of said element is transmitted to arcuate movement of said circuit controlling means.

2. A device of the character described, comprising, in combination, a linearly movable relatively rigid bar, a condition responsive element associated with an end thereof and adapted to move said bar upon condition change, a pair of oppositely disposed arcuate surfaced members revolvably mounted adjacent the end of said bar opposite said element and on opposite sides thereof in frictional engagement therewith, resilient means holding said members in said frictional engagement, and circuit controlling means operated by said members.

3. A device of the character described, comprising, in combination, a linearly movable relatively rigid rod, a condition responsive element associated with an end of said rod and adapted to move the same upon condition change, a pair of oppositely disposed substantially parallel rollers revolvably mounted adjacent the opposite end of said rod and frictionally engaging therewith upon opposite sides thereof, mounting means for said rollers comprising a pin extending through each of said rollers and extending a relatively substantial distance beyond the axial extremities thereof, supports for said pins, spring means disposed between adjacent ends of said pins whereby said rollers are drawn inwardly toward the periphery of said rod, arms carried by each of said rollers whereby upon rotation of said rollers by movement of said rod said arms are moved through an arcuate path, contact members disposed on said arms and additional contact members positioned in the path of movement of said first mentioned contact members and adapted to be engaged thereby.

4. A device of the character described, comprising, in combination, a condition responsive means, a substantially straight element moved longitudinally thereby, a circuit controlling means, means connecting said circuit controlling means to said element, said last mentioned means comprising a member having an arcuate extremity frictionally engaging a peripheral surface of said element and tangentially disposed with respect thereto, means for maintaining said element in engagement with said member comprising a spring and roller engaging said element, means to limit the movement of said circuit controlling means whereby upon movement of said element within said limit a rolling motion will be imparted through said arcuate extremity to said member but upon motion beyond said limit said element will slip with respect to said member.

5. A slip friction mechanism, comprising, in combination, a linearly movable element, a pair of parallel rollers oppositely disposed and tangential to the periphery of said element, spring means tending to draw said rollers towards each other and hence into frictional engagement with said rod, and means to limit the movement of said rollers, the arrangement being such that upon said limiting of said movement said resilient means will yield to permit said element to slip with respect to said rollers.

6. A switching mechanism comprising, in combination, a condition responsive element, a linearly movable rod adapted to be actuated thereby, a switch, and means associated with said rod to control the opening and closing of said switch, said last mentioned means comprising a roller, a contact carrying member rigidly associated with said roller, said roller being positioned tangential to and in frictional engagement with a peripheral portion of said rod whereby condition change serves to actuate said element to impart motion to said rod and hence to said switch controlling member to open or close said switch.

7. A switching mechanism comprising, in combination, a condition responsive element, a linearly movable rod actuated thereby, a plurality of contacts and means associated with said element to actuate said plurality of contacts, said last mentioned means comprising rollers in frictional engagement with a peripheral portion of said rod and arms bearing said contacts mounted on said rollers.

8. A device of the character described comprising in combination, a rod movable longitudinally in response to variations in temperature, a revolvable member having a rounded channel shaped portion in frictional engagement with said rod, and circuit controlling means actuated by said member.

9. A device of the character described comprising in combination, a rod movable longitudinally in response to variations in temperature, a revolvable member having a rounded channel shaped portion in frictional engagement with said rod, a movable contact carried by said member, a stationary contact for cooperation therewith, and a mercury switch carried by said element and adapted to be actuated upon longitudinal movement of said rod.

10. A slip friction mechanism comprising in combination, a longitudinally movable rod, an axle, a roller mounted on said axle, a support, slots in said support, said axle being mounted in said slots, resilient means holding said roller in engagement with said rod, and stops limiting the rotative movement of said roller whereby upon movement of said rod in one direction said roller will rotate against one of its stops and on further movement of said rod in the same direction said roller will slip with respect to said rod.

11. In a device of the character described comprising in combination, a substantially straight actuating member, a rotatably mounted actuated member having an arcuate surface in engagement with said actuating member, means to cause longitudinal movement of said actuating member in response to changes in a condition, stops for limiting the rotation of said actuated member, and resilient means acting on said actuated member to hold it in engagement with said actuating member.

12. In a device of the character described comprising in combination, a longitudinally movable bar, means for moving the bar back and forth in response to condition variations, a pair of friction members engaging opposite sides of said bar, spring means connected between said members and holding them in engagement with said bar, and means for limiting the movement of said members.

13. In a device of the character described comprising in combination, a longitudinally movable bar, heat responsive means for moving said bar back and forth, a pair of friction elements engaging opposite sides of said bar, spring means extending between said elements and holding them in engagement with said bar, movable contacts mounted on said friction elements, and stationary contacts for cooperation with said movable contacts, said stationary contacts limiting the movement of said friction elements.

14. In a device of the character described comprising in combination, a longitudinally movable bar, a pair of friction elements engaging opposite sides of the bar, spring means extending between said elements to hold them in engagement with said bar, movable contacts on said elements, stationary contacts, heat responsive means for moving said bar in one direction to first disengage the movable contact of one element from its stationary contact and then engage the movable contact on the other element with its stationary contact, and a stop for limiting the movement of said one element away from its stationary contact, said one element slipping with relation to said bar on its continued movement in said one direction.

15. A slip friction switching mechanism comprising in combination, a longitudinally movable bar, a pair of friction elements engaging opposite sides of said bar, a pair of contacts moved by one of said elements, a pair of stationary contacts cooperating therewith, a contact moved by the other of said elements, a stationary contact for cooperation therewith, and a thermostat for moving said bar in one direction to first cause said one element to move one of its contacts out of engagement with its stationary contact, then said other element to move its contact into engagement with its stationary contact after which said other element slips with respect to said bar, then said one element to move its other contact out of engagement with its stationary contact, after which said one element engages a stop and slips with respect to said bar on further movement of said bar in said one direction.

16. A slip friction switching mechanism comprising in combination, a longitudinally movable bar, a pair of friction elements engaging opposite sides of said bar, a pair of contacts moved by one of said elements, a pair of stationary contacts cooperating therewith, a contact moved by the other of said elements, a stationary contact for cooperation therewith, a thermostat for moving said bar in one direction to first cause said one element to move one of its contacts out of engagement with its stationary contact, then said other element to move its contact into engagement with its stationary contact after which said other element slips with respect to said bar, then said one element to move its other contact out of engagement with its stationary contact, after which said one element engages a stop and slips with respect to said bar on further movement of said bar in said one direction, said thermostat moving said bar in the opposite direction to first cause said other element to move its contact out of engagement with its stationary contact, and then cause said one element to move its said other contact and then its said one contact into engagement with their respective stationary contacts after which said one element slips with respect to said bar, and a stop positioned for engagement by said other element to cause it to slip with respect to said bar.

17. A slip friction switching mechanism comprising in combination, a longitudinally movable bar, a pair of friction elements engaging opposite sides of said bar, a pair of contacts moved by one of said elements, a pair of stationary contacts cooperating therewith, a contact moved by the other of said elements, a stationary contact for cooperation therewith, a thermostat for moving said bar in one direction to first cause said one element to move one of its contacts out of engagement with its stationary contact, then said other element to move its contact into engagement with its stationary contact after which said other element slips with respect to said bar, then said one element to move its other contact out of engagement with its stationary contact, after which said one element engages a stop and slips with respect to said bar on further movement of said bar in said one direction, said thermostat moving said bar in the opposite direction to first cause said other element to move its contact out of engagement with its stationary contact, and then cause said one element to move its said other contact and then its said one contact into engagement with their respective stationary contacts after which said one element slips with respect to said bar, a stop positioned for engagement by said other element to cause it to slip with respect to said bar, and a mercury switch actuated by said one element.

18. In a device of the character described comprising in combination, a longitudinally movable bar, a pair of independently mounted friction elements engaging opposite sides of said bar, at least one open contact switch operated by each element, and a mercury switch actuated by one of said elements.

19. A device of the character described comprising in combination, a longitudinally movable member, a thermal element for moving said member back and forth in response to temperature changes, a pair of rotatably mounted switch actuating devices on different sides of said member, and separate operating connections between said member and each device, each of said connections including slip friction means whereby said member may move independently of said devices.

20. In a device of the character described comprising in combination, a longitudinally movable member, means for moving said member back and forth in response to condition variations, a pair of friction elements engaging opposite sides of said member, spring means acting on one of said elements to cause it to forcibly engage said longitudinally movable member and hold it in engagement with the other of said friction elements, and means for limiting the movement of said elements.

21. In a device of the character described comprising in combination, a longitudinally movable member, means for moving said member back and forth in response to condition variations, a pair of friction elements engaging opposite sides of said member, a single spring means operative to hold said member and said elements in frictional engagement, and means for limiting the movement of said elements.

ERNEST M. MILLER.